Feb. 18, 1947. E. J. NAUMANN 2,416,202
TREATMENT FOR RESINS TO ELIMINATE STATIC
Filed Jan. 14, 1942

INVENTOR
Edward J. Naumann.

Patented Feb. 18, 1947

2,416,202

UNITED STATES PATENT OFFICE 2,416,202

TREATMENT FOR RESINS TO ELIMINATE STATIC

Edward J. Naumann, Baltimore, Md., assignor to Westinghouse Electric Corporation, East Pittsburgh, Pa., a corporation of Pennsylvania Application January 14, 1942, Serial No. 426,726

7 Claims. (Cl. 175—264)

This invention relates to resins, more particularly the surfaces of formed resin bodies in order to maintain predetermined surface conditions.

It has been observed that formed resin bodies accumulate dust and the like very rapidly with some consequent deterioration in the surface conditions of the bodies. This phenomenon is particularly noticeable and objectionable in the case of transparent resins which are employed as windows or transparent covers since in such cases an appreciable amount of dust will accumulate on these transparent surfaces or windows in one day. Resin windows must be frequently cleaned in order to maintain a predetermined visibility through them. In cases where both surfaces of the resin window are not conveniently available, cleaning entails considerable trouble, and is an undesirable feature connected with the use of resin windows.

One of the objects of this invention is to provide for maintaining a predetermined visibility through the surfaces of transparent resins.

A further object of the invention is to provide for a treatment of the surfaces of resin to reduce the collection of dust and other substances tending to reduce the visibility therethrough.

Other objects of the invention will in part be obvious and will in part appear hereinafter.

Figure 1:
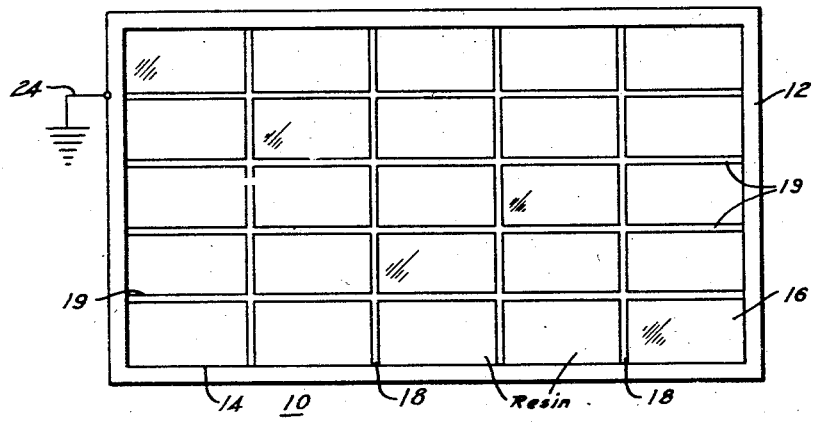
Figure 2:
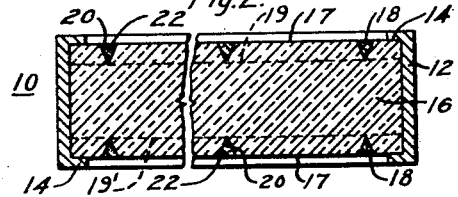
Figure 3:
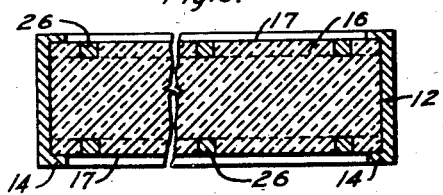

For a fuller understanding of the nature and objects of the invention reference should be had to the following detailed description taken in conjunction with the accompanying drawing, in which:

Figure 1 is a view in elevation showing a window prepared according to the invention, Fig. 2 is an enlarged cross-sectional view of a window of the type shown in Fig. 1, and Fig. 3 is an enlarged cross-sectional view of a modified form of resin window.

Due to the accumulation of dust and other matter tending to reduce the transmission of light through transparent resin sheets, panels and the like, it has been necessary previously to regularly clean both surfaces of the resin bodies at frequent intervals. It has been found that the accumulation of dust and the like is probably due to the electro-static surface charge which accumulates on the resin and causes the attraction of charged dust particles thereto.

According to this invention, the surfaces of resin bodies may be treated in such a manner as to ground the static charges which tend to form on the surfaces of the resin and thereby prevent the excessively rapid accumulation of dust and the like. Electrically conducting means for dissipating electrical charges on the surfaces of resinous members may be applied in numerous ways. Such conducting means need not cover the entire surface of the resin but may be applied in a predetermined spacing and grounded, and has proven to be completely satisfactory for the purpose. The electrical surface conductor treatment may be applied to all types of resin. For example, polystyrene, methylmethacrylate and cellulosic sheets respond satisfactorily to the treatment for dissipating electrical charges. The treatment is however not limited to the above mentioned resins but may be extended to almost any resin material having a tendency toward the collection of electro-static charges. Therefore, the application of electrical conductors to the surface to prevent dirt and dust accumulating may be employed with non-transparent resin in order to maintain predetermined surface conditions of gloss and color.

One method of producing a window which is not subject to rapid clouding with dirt and dust is shown in Fig. 1. The window 10 of Fig. 1 comprises a metal frame work 12 which may be grounded, the frame work supporting a transparent sheet of resin 16 through which observations are to be made. The resin sheet 16 is provided with a plurality of electrical conductors 18 in a predetermined spacing and a lesser number of tie in conductors 19, the conductors 18 and 19 being in electrical contact with the frame 12. The frame may be grounded by suitable grounding means 24. The metal frame work 12 and the conductors 18 and 19 may be in the nature of a grid into which the resin sheet 16 is formed as by casting or molding. The metal frame work 12 and the conductors 18 and 19 may however be applied separately by pressing into or by fastening to the resin sheet 16 after the resin has been molded or extruded as a flat sheet.

Referring to Fig. 2 of the drawing, an enlarged fragmentary cross-sectional view of the window 10 of Fig. 1 is shown. The resin sheet 16 is retained in the frame 12 by the flanges 14. The frame 12 may be an integral part of the window whereby the window may be applied to any desired type of apparatus, or the frame 12 may be a part of the apparatus with provision made for introducing the sheet of resin 16 prepared with inlaid conductors beforehand. The electrical conducting means 18 and 19 of Fig. 1 are introduced into the surfaces 17 of the resin sheet prepared by engraving or scoring lines, grooves, or indentations 20 in the resin material. The indentations or grooves 20 may also be produced by suitably scoring the sheet during the molding or manufacturing operations. The grooves or indentations 20 are suitable for receiving a number of electrical conductors 22 which form the means 18 and 19. The conductors 22 are exposed to the atmosphere substantially in the same plane or flush with the surfaces 17 of the sheet of resin.

One suitable electrical conductor 22 for application to the indentations 20 is a mixture of white lead and lamp black. Sufficient white lead is added to the lamp black to produce a composition which may be applied to the indentations by means of a putty knife or any other suitable tool. After the indentations have been filled the mixture is allowed to dry and harden. The surfaces may be cleaned of the surplus electrical conductor mixture without disturbing the material in the indentations 20. Numerous other types of plastic composition may be provided for filling the indentations 20. For example: finely powdered molybdenum sulfide, graphite, or carbon may be mixed in suitable proportions with a carrier such as white lead, putty, or some similar material.

It is preferable that both surfaces of any transparent resin to be used for a window be treated with a network of indentations filled with the electrically conducting means. The width of the grooves 20 is unimportant electrically so long as an electrically conducting circuit may be maintained (even to the extent of one megohm resistance) to the grounding frame 12. The resin window 16 may be treated as described herein and be grounded without the use of any frame whatever.

In some cases, particularly where the resin windows are to be employed in connection with air-tight devices, such for example, as electrical instruments, meters, telescopic devices and the like substantially without dust in the interior, then only the external surface of the window need be treated with the network of static charge removing conductors.

A modification of the invention is shown in an enlarged cross-section in Fig. 3 wherein the resin panel 16 mounted in the metal frame 12 has disposed in the surface thereof a plurality of metallic wires 26 (of copper for example) capable of conducting electro-static charge from the surface 17 of the resin sheet 16. The metallic conductors 26 may be inset into the surface 17 of the resin by either using preformed indentations conforming to the shape of the conductors 26 or by heating the conductors to a degree sufficient to cause the resin that comes in contact with the conductors to melt and permit the conductors to assume a plane the same as the surface 17. After the conductors 26 have been applied to the surface, the entire surface may be polished to remove any excess resin forced up and to expose the conductors 26 to the atmosphere.

It has been found desirable in all cases that the surface of the electrical conducting means should be substantially flush with the surface 17 of the resin sheet 16. This is advantageous because the resin sheet is easier to clean and there is less danger of the electrical conducting means being disturbed by accidental contact with the surface thereof.

Other methods of providing a spaced network of electrical conductors on the surfaces of the sheets of resin may be successfully applied. Indentations in the surfaces of the resin may be filled by plating conducting metal into the indentations. This may be attained by applying a minute quantity of an electrically conducting material in the indentations sufficient to permit the flow of electrical current along the indentations when the window is immersed in the plating bath. Only a small quantity of metal need be plated to provide for satisfactory discharge of static electricity.

In the case of transparent resin it has been found that if the electrical conductors be applied in a network or in a spacing whereby no portion of the surface is more than one quarter inch away from a conductor, highly satisfactory results are attained. The resin windows prepared with this spacing have a clarity comparable to that of window glass and the collection of dirt and dust thereon may be even less than that on ordinary glass. While the electrical conductors may be applied in even finer spacing, this is not desirable since it may interfere somewhat with the visibility through the window as a whole. Increasing this spacing between the electrical conductors will produce some improvement over resin windows lacking any conducting means, and the accumulation of dust will be retarded.

Waxes which have the properties of conducting static charges may be applied to the resin window, with or without the electrical conductors distributed therein, with some benefits. The material sold under the trade name of "Simoniz" wax has been found to be noticeably effective in preventing the accumulation of dust particles. Accordingly, it may be desirable to apply this or an equivalent material to the surface of the resin. Any transparent electrical conductor whether applied mechanically or by electrolytic deposition or by evaporating films of conducting mineral would be helpful in reducing the formation of dust and dirt deposits. Thus transparent decalcomania have been applied with good results.

Windows corresponding to the windows 10 of Fig. 1 may be applied in electrical apparatus for inspection purposes, also for the covers of instruments and meters and related apparatus. The resin with conducting means on its surfaces is found suitable for use on the plastic enclosures employed in aircraft and other equipment. Optical instruments may be protected by applying a window of the type disclosed in this invention and the accumulation of dust on the optically ground surfaces will be greatly or entirely reduced and therefore no wiping of the optical surfaces will be required. Other uses will be obvious to those skilled in the art.

Since certain changes in carrying out the above process and certain modifications in the article which embody the invention may be made without departing from its scope, it is intended that all matter contained in the above description or shown in the accompanying drawing shall be interpreted as illustrative and not in a limiting sense.

I claim as my invention:

1. A transparent resinous member subject to the accumulation of electrical charges and means for dissipating electrical charges applied to a surface of the transparent member whereby the accumulation of electrical charges and the collection of charged dust particles thereon is prevented.

2. A transparent resinous member subject to the accumulation of electrical charges, an electrical conductor applied to the surface of the resinous member subject to dust deposition to dissipate electrical charges and means for grounding the electrical conductor.

3. A window comprising, in combination, a transparent resin panel, a network of electrical conductors disposed on the surfaces of the resin panel in spaced configuration and exposed to the atmosphere, and means for grounding the network of electrical conductors to provide for maintaining the surface transparency of the resin panel.

4. A window comprising, in combination, a frame, a sheet of transparent resin in the frame and means for dissipating electrical charges associated with the resin applied in predetermined spacing to the surface of the sheet of resin, the means for dissipating electrical charges being disposed in electrically contacting relation with the frame to provide for maintaining the clarity of the surface of the resin.

5. A window comprising, in combination, a body of transparent resin, indentations in the surface of the body of transparent resin, the indentations being distributed to provide for a predetermined spacing and means for dissipating electrical charges disposed in the indentations, the means for dissipating electrical charges being exposed to provide for maintaining the surface clarity of the resin body.

6. A member, comprising, in combination a body of transparent resinous material subject to accumulation of static charges on its surface, the static charges attracting and collecting charged dust particles and the like on the surface, and an electrical conductor applied to the surface of the body in predetermined spacing whereby no portion of the surface is substantially more than one quarter of an inch away from the conductor, to materially reduce the static charges and thereby prevent the accumulation of charged dust particles.

7. A member, comprising, in combination a body of transparent resinous material subject to accumulation of static charges on its surface, the static charges attracting and collecting charged dust particles and the like on the surface, and an electrical conductor applied to and imbedded in the surface of the body in predetermined spacing, to materially reduce the static charges and thereby prevent the accumulation of charged dust particles.

EDWARD J. NAUMANN.

REFERENCES CITED

The following references are of record in the file of this patent:

UNITED STATES PATENTS

| Number | Name | Date |
| --- | --- | --- |
| 2,300,923 | Hornor | Nov. 3, 1942 |
| 546,802 | Aryton et al. | June 13, 1922 |
| 1,419,261 | Howard | July 6, 1937 |
| 2,086,516 | Curtin | Nov. 3, 1942 |